(12) United States Patent
Edgerly

(10) Patent No.: US 6,390,344 B1
(45) Date of Patent: May 21, 2002

(54) MODULAR HITCH MOUNT CONNECTION

(75) Inventor: Jeffrey R. Edgerly, Bristol, CT (US)

(73) Assignee: Industri AB Thule, Hillerstorp (SE)

( * ) Notice: Subject to any disclaimer, the term of this patent is extended or adjusted under 35 U.S.C. 154(b) by 0 days.

(21) Appl. No.: 09/655,037

(22) Filed: Sep. 5, 2000

Related U.S. Application Data

(63) Continuation of application No. 09/537,788, filed on Mar. 29, 2000.
(60) Provisional application No. 60/126,665, filed on Mar. 29, 1999.

(51) Int. Cl.$^7$ ................................................. B60R 9/00
(52) U.S. Cl. ..................... 224/531; 224/402; 224/403; 224/521; 224/554
(58) Field of Search ................................ 224/531, 402, 224/403, 521, 554; 403/181, 188, 191, 192, 230, 231, 302, 403

(56) References Cited

U.S. PATENT DOCUMENTS

| | | | | |
|---|---|---|---|---|
| 5,649,656 A | * | 7/1997 | Davy | 224/403 X |
| 5,749,697 A | * | 5/1998 | Davis | 224/403 X |
| 6,036,417 A | * | 3/2000 | Weaver | 224/403 X |
| 6,152,675 A | * | 11/2000 | Compton | 224/403 X |

* cited by examiner

Primary Examiner—Gregory M. Vidovich
Assistant Examiner—Maerena W. Brevard
(74) Attorney, Agent, or Firm—Kilpatrick Stockton LLP

(57) ABSTRACT

A modular hitch mount connection for attaching a tubular carrier structure to a load arm that is inserted in the receiving tube of a receiving type hitch. A tubular seat is provided that has an open end for slidably receiving the support tube in an open end of the seat. Correct positioning of the support tube in the tubular seat produces alignment of holes in walls of the tubular seat with orifices in sidewalls of the support tube. A tensioning bolt inserted through a hole in the seat wall and a corresponding orifice in the sidewall of the support tube screwably engages a threaded nut located inside the support tube to secure the support tube to the tubular seat and in the process reduce play and wobble between them. Further play and wobble may be eliminated from the modular hitch mount connection by further inserting a connecting bolt through a hole in another wall of the tubular seat and a corresponding orifice in the second sidewall. Similarly, a receiving nut is provided on the interior surface of the support tube, but a central axis of the second nut is oriented at 90° to that of the first nut because it is on an adjacent wall of the support tube. This cross-orientation of the bolts cooperates to secure the support tube to the tubular seat. The tensioning bolt and the connecting bolt together restrict movement of the support tube by causing solid contact between the walls of the tubular seat and the sidewalls of the support tube.

40 Claims, 3 Drawing Sheets

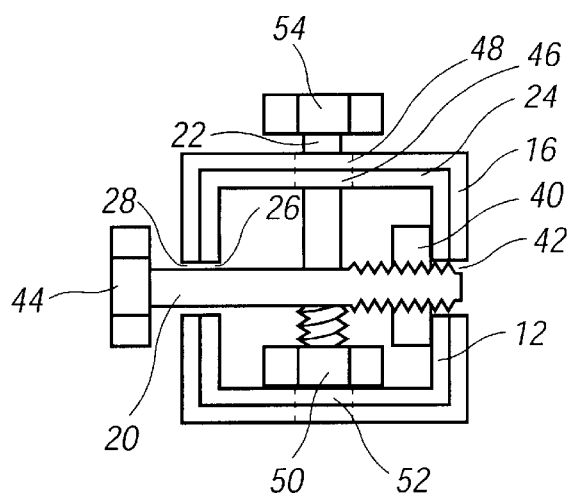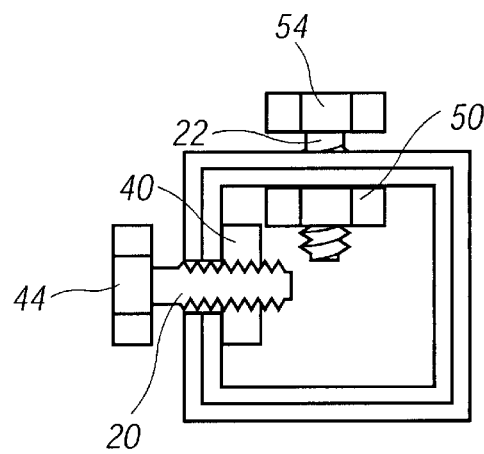
*FIG. 4A*      *FIG. 4B*
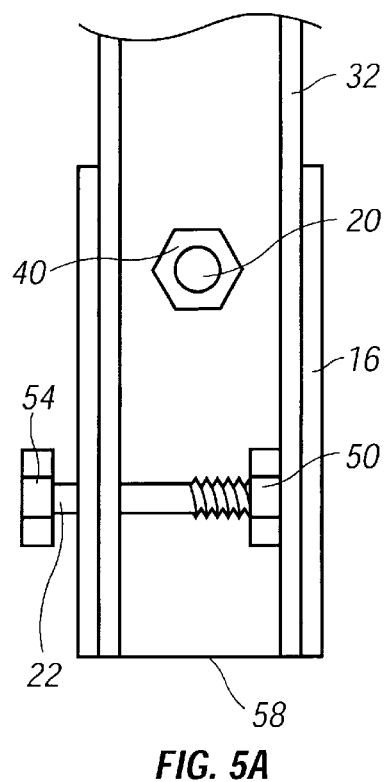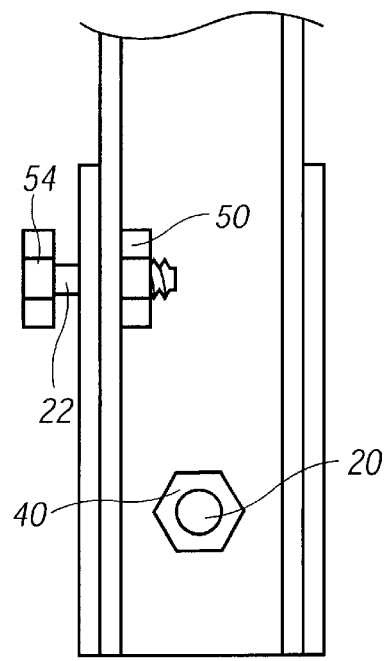
*FIG. 5A*      *FIG. 5B*

MODULAR HITCH MOUNT CONNECTION

RELATED PATENT APPLICATIONS

This application is a continuation patent application of U.S. application Ser. No. 09/537,788 filed Mar. 29, 2000 and entitled MODULAR HITCH MOUNT CONNECTION which claims priority to U.S. Provisional Application No. 60/126,665 filed Mar. 29, 1999 and also entitled MODULAR HITCH MOUNT CONNECTION. Said applications in their entireties are hereby expressly incorporated by reference into the present application.

DESCRIPTION

1. Technical Field

The present invention relates generally to connection assemblies for mounting modular-type carrier structures upon a transporting vehicle. In an exemplary embodiment utilized herein for illustrative purposes, the article to be connected to the transporting vehicle is a load carrier designed for transporting sports equipment such as bicycles on a motor vehicle. In the disclosed assembly, a unique modular hitch mount connection is utilized that provides wobble-free interconnection between the load carrier and the receiving mount on the vehicle.

2. Background Art

Attachment of a carrier frame behind a vehicle to transport equipment, especially sports equipment such as bicycles, is well known. A problem with carrier frames, attached to vehicles, occurs when encountering rough terrain during a journey. Since most carrier frames have interconnected modular parts, including the connection to a vehicular mounted hitch receiver, the opportunity exists for the occurrence of play or wobble between parts. Depending on the extent of such play or wobble, the load carrier frame may permit or generate movement that causes equipment supported on the carrier to collide with the load carrier frame, its support structure, or the rear of the vehicle. The result of such a failure to control the relative movement of the components can be damage to the sports equipment or to the vehicle itself. Therefore, it becomes important to minimize any wobble or play associated with the load carrier frame and its connection to the carrying vehicle.

U.S. Pat. No. 5,244,133 provides a description of a wobble-free trailer hitch mounting. The mounting fits inside the receiving opening of a receiver type hitch. At least a portion of the mounting responds to the rotation of a threaded rod to enlarge the effective width of the mounting. When positioned inside the receiving hitch, as its effective width increases, the mounting exerts pressure on the inner walls of the receiving hitch and this limits play between the mounting and the receiving hitch to meet the requirement that the connection be wobble-free. The mounting of the '133 patent, however, includes multiple parts and a relatively complex mechanism to increase the effective width of a portion of the mounting to exert wobble free gripping action against the receiving hitch.

U.S. Pat. No. 5,820,004 also describes an anti-wobble connector to remove play or wobble that might occur between the load carrier and transporting vehicle. The anti-wobble connector of the '004 patent includes several relatively small parts that may easily be lost. The tension required to preclude wobble and remove play in the interconnection is concentrated upon an entry surface of the hitch receiver in such a manner that the force required to limit undesirable movement is localized in a relatively small region of the connection between the anti-wobble connector and the receiving hitch. These concentrated forces can result in high levels of stress in the component parts.

In view of the above described deficiencies associated with the use of known designs for anti-wobble connections, especially in hitch mounted load carriers, the present invention has been developed to alleviate these drawbacks and provide further benefits to the user. These enhancements and benefits are described in greater detail hereinbelow with respect to several alternative embodiments of the present invention.

DISCLOSURE OF THE INVENTION

The present invention in its several disclosed embodiments alleviates the drawbacks described above with respect to conventionally designed modular hitch mount connections and incorporates several additionally beneficial features. A noticeable beneficial feature of the current invention is the simplicity of the mechanism for removing play or wobble between parts of the connection. The elegance of the design is obvious in the illustrated embodiment in which an appropriate wobble-free securement is accomplished utilizing a pair of strategically located nuts positioned at an angle of 90° to each other on internal surfaces of a tubular section of the assembly referred to herein as a support tube. Access orifices, formed in the support tube adjacent the nuts provide entry access for coupling bolts to be installed therein.

Formation of the modular hitch mount connection of the invention requires insertion of the support tube into a mounting member, described herein as a tubular seat. The access orifices in the support tube become aligned with mounting holes in the tubular seat when the support tube is inserted correctly into the seat. Correct alignment of the parts facilitates formation of a connection between them using a pair of coupling bolts. The first coupling bolt passes through the openings in the tubular seat and the support tube and extends across the width of the combined tubes for ultimate engagement with the nut that is secured to the internal surface of the support tube. Rotation of the engaged bolt draws the head of the bolt into contact with the outer surface of the tubular seat and upon continued rotation, the tubular seat makes firm contact with the outer surface of the support bar. In this manner, the first coupling bolt connects the tubular seat to the support bar and limits movement between them. A second coupling bolt is inserted through orifices located at a different horizontal level and at 90° to the first coupling bolt on an adjacent face of the support as is illustrated. The second coupling bolt engages a second nut that is similarly secured to the inside of the support tube in alignment with the second set of orifices. Rotation of this second coupling bolt affects a similar connection and limitation of movement between the tubular seat and the support tube. The now fully formed modular hitch mount connection of the invention provides a tightened structure with two primary connecting forces operating at 90° to one another to draw the support bar into solid, wobble-free contact with the tubular seat. The area of contact involves longitudinal surfaces extending the full length of the portion of the support tube positioned inside the tubular seat.

The modular hitch mount connection of the present invention possesses an additional beneficial feature related to its efficient use of a minimized number of parts. Essentially, only the coupling bolts represent components that are loosenable from the primary load carrier structure. A lost bolt will be easy to replace, since the connection is designed to utilize standard coupling bolts of a common, standard size. Because the current invention uses a dual bolt connection system, the loss of one bolt does not prevent formation of a suitable connection, albeit less rigid. This contrasts with designs in the prior art where loss of a part essentially disables the connection mechanism.

In at least one embodiment of the present invention, a modular hitch mount connection is provided for attaching a tubular carrier structure to a load arm inserted in the receiving tube of a receptacle-type hitch. The modular hitch mount connection includes a tubular seat having an open end, and a first wall joined at an angle of 90° to a second wall. The first wall and the second wall each have at least one hole formed therein. A support tube is included that has a proximate end and a distal end with respect to the tubular seat. The proximate end is sized to slidably engage the tubular seat at the open end of the seat. The support tube also has an inner surface and a first sidewall disposed at 90° to a second sidewall. Like the tubular seat, the first sidewall and the second sidewall of the support tube each have at least one orifice formed therein. When properly assembled, the first wall of the tubular seat is located adjacent the first sidewall of the support tube with the hole in the first wall axially alignment with the orifice in the first sidewall. Similarly, the second wall of the tubular seat is located adjacent the second sidewall of the support tube when assembled with the hole of the second wall in axial alignment with the orifice of the second sidewall. Two threaded nuts are secured upon the inner surfaces of the support tube in axial alignment, one each with the orifices through the first and second sidewalls. Two cross-oriented tensioning bolts are inserted and screwably engaged, one each, into the threaded nuts for securing the support tube to the tubular seat. Upon continued rotation and ultimately tightening of the tensioning bolts, movement of the support tube relative to the tubular seat is prevented by the resulting solid and pressing contact between the first wall and the first sidewall and the second wall and the second sidewall.

The beneficial effects described above apply generally to the exemplary devices and mechanisms disclosed herein for a secure and play-reduced modular hitch mount connection typically for utilization in the mounting of a load carrier to a transporting vehicle. The specific structures through which these benefits are delivered will be described in detail hereinbelow.

BRIEF DESCRIPTION OF THE DRAWINGS

The invention will now be described in greater detail in the following way of example only and with reference to the attached drawings, in which:

FIG. 4A provides a cross sectional view of the modular hitch mount connection of the invention taken along line 4—4 of FIG. 3.

FIG. 4B provides a cross sectional view of the modular hitch mount connection of the invention taken along line 4—4 of FIG. 3 showing alternative positioning of the threaded nut and receiving nut on the inside wall of the support tube.

FIG. 5A is a cross sectional view of the modular hitch mount connection using coupling bolts to bear the weight of the support tube inside the mount.

FIG. 5B is a cross sectional view of the modular hitch mount connection using coupling bolts to bear the weight of the support tube inside the mount and showing alternative positioning of the threaded nut and receiving nut on the inside wall of the support tube.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1A:
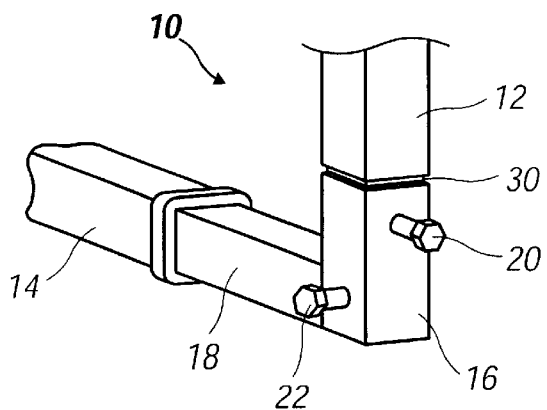
FIG. 1A is a perspective view, including the hitch mount connection of the invention incorporated into a modular hitch mount positioned in the receiving opening of a receiver type hitch.
Figure 1B:
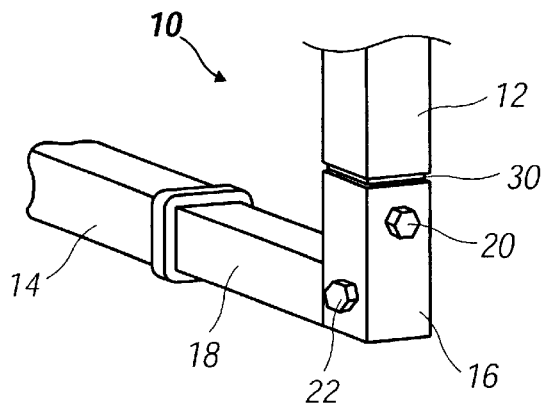
FIG. 1B is a perspective view, including the hitch mount connection of the invention including a tubular seat of extended length.

Referring to the Figures and using like reference numerals to identify like parts throughout the several views, FIG. 1A shows a hitch mount structure 10 for mounting a support tube 12 of a portable carrier frame (not shown in its entirety) to a receiving-type hitch mount 14 located on a transporting vehicle (not shown) using a tubular seat 16 coupled to a load arm 18 insertably positioned in a receiving channel of the receiving type hitch 14. The tubular seat 16 accommodates a tensioning bolt 20 and a connecting bolt 22 that is oriented at a right angle to the tensioning bolt 20. Together, these bolts 20,22 provide connection of the support tube 12 to the tubular seat 16 and, in addition, cooperate to remove play and wobble between these abutting components. The length of the tubular seat 16 may vary. An embodiment, shown in FIG. 1B, includes a tubular seat 16 extending higher above the load arm 18 than the one illustrated in FIG. 1A.

Figure 2:
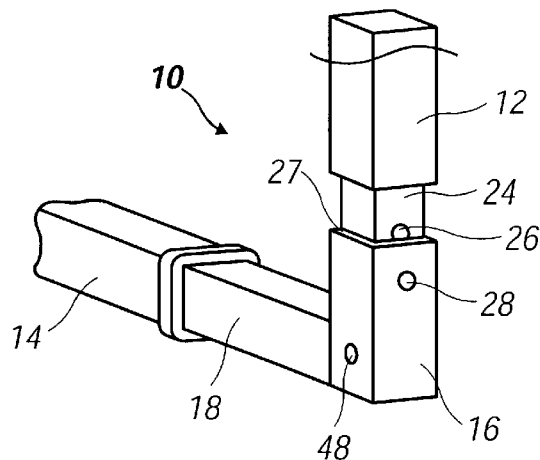
FIG. 2 is a perspective view of a support tube partially inserted into a hitch mount.

In forming the connection between the support tube 12 and the tubular seat 16 the cross-section of the support tube 12 is of suitable dimensions for accommodating sliding engagement with the inside of the tubular seat 16. FIG. 2 shows a support tube 12 having a narrow end portion 24 partially inserted into the tubular seat 16. An orifice 26 in the sidewall of the narrow end portion 24 aligns with the hole 28 in the tubular seat 16 when the support tube 12 is fully inserted into the tubular seat 16. In this embodiment of the invention, the outer surfaces of the tubular seat 16 and the support tube 12 provide an essentially continuous surface when properly configured together as shown in FIG. 1. That is, the joint 30 between the two parts 12,16 is designed to appear as seamless as possible when the narrow end portion 24 of the support tube 12 is correctly seated with the orifice 26 aligned with the hole 28 in the tubular seat 16.

Figure 3:
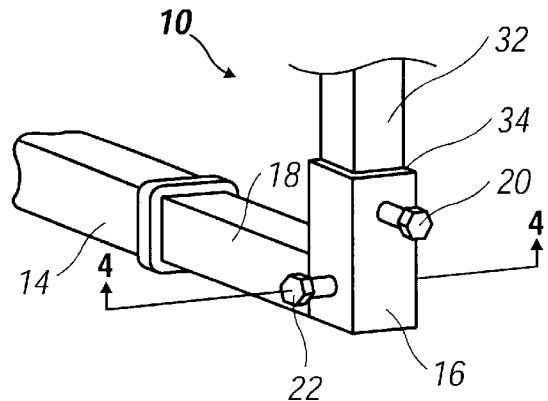
FIG. 3 is a perspective view similar to FIG. 2 except for a change in the cross section of the support tube.

The view shown in FIG. 3 includes a support tube 32, differing from the support tube 12 of FIG. 2 in that the support tube 32 has uniform cross-sectional dimensions along its length. With this support tube 32 fully inserted in the tubular seat 16, a noticeable step or ledge 34 appears at the joint between the support tube 32 and the tubular seat 16. FIG. 3 also includes a tensioning bolt 20 inserted through the hole 28 and the orifice 26 (see FIG. 2) and a connecting bolt 22 inserted through a corresponding hole and orifice formed, in the tubular seat and support tube respectively, but at right angles to the hole 28 and orifice 26 previously described.

Having described the modular parts of the hitch mount structure 10 and provision of orifices and holes to allow insertion of tensioning bolts, FIGS. 4A through 7 present details of the simple, yet effective way in which the invention connects the support tube 12 to the tubular seat 16 and minimizes play and wobble within the connection. FIG. 4A is a cross-sectional view taken through line 4—4 of FIG. 3. It illustrates the narrow end portion 24 of the support tube 12 located inside the tubular seat 16 with the tensioning bolt 20 inserted through the hole 28 and the orifice 26 to engage a threaded nut 40 that is secured to the inside wall of the support tube 12. The threaded nut 40 may be secured by any number of conventional methods with welding being preferred. A first channel 42 formed in the walls of the support tube 12 and the tubular seat 16 allows the tensioning bolt 20 to extend through and beyond the threaded nut 40. Rotation of the tensioning bolt 20, typically using an appropriately configured wrench, causes its screwing engagement into the threaded nut 40 forming a connection between the support tube 12 and the tubular seat 16. With continued rotation, the head 44 of the tensioning bolt 20 abuts the surface of the tubular seat 16 resisting further progression of the tensioning bolt 20. Thus restricted, further turning of the tensioning bolt 20 draws the threaded nut 40 towards the tensioning bolt head 44. This causes movement of the support tube 12 into contact with the inner surface of the tubular seat 16. The degree of pressure by which contact is maintained directly influences the ability of the connection to reduce play or wobble between the so secured components. The amount of pressure exerted between the two abutting components will be determined by the amount of turning force applied to the tensioning bolt 20.

Additional rigidity is introduced into the modular hitch mount connection of the invention using a second securing member of the type described above relative to the tensioning bolt 20. This second connection includes the connecting bolt 22 oriented at a 90° angle to the tensioning bolt 20. The connecting bolt passes through a hole 48 in the tubular seat 16 and an orifice 46 in the support tube 12 to engage a receiving nut 50 that is similarly securely held to the inner wall of the support tube 12. The relative positioning of the holes 28,48 and orifices 26,46 prevents obstruction of the connecting bolt 22 by the tensioning bolt 20 and vice versa. A second channel 52 is formed through the walls of the support tube 12 and the tubular seat 16 accommodates the connecting bolt 22 as it exits through the receiving nut 50. As described with respect to the tensioning bolt arrangement, rotation of the connecting bolt 22, using an appropriate wrench, causes its movement into the receiving nut 50 thereby forming a connection between the support tube 12 and the tubular seat 16. With continued rotation, the head 54 of the connecting bolt 22 abuts the surface of the tubular seat 16 halting the motion of the connecting bolt 22. Thus restricted, the connecting bolt 22 draws the receiving nut 50 towards the connecting bolt head 54. This causes movement of the support tube 12 into abutting engagement with additional area of the inner surface of the tubular seat 16. In this manner, essentially all play and wobble is eliminated from the connection assembly.

A different embodiment of the present invention, shown in FIG. 4B, places the threaded nut 40 and the receiving nut 50 on the inside wall of the support tube 12 closest to the entry points of the tensioning bolt 20 and the connecting bolt 22.

In the condition shown in FIG. 4A the positioning of the threaded 40 and receiving 50 nuts places them under tension that could, after prolonged use, cause the nuts 40,50 to fracture from the inside wall e.g. due to metal fatigue. When the nuts 40,50 are in the positions shown in FIG. 4B they adopt a condition under compression during engagement and tightening of the bolts 20,22 to remove wobble from the connection assembly. The latter condition under compression is a preferred condition for avoiding bond failure between a nut 40,50 and the inside wall of the support tube 12. An additional benefit of the configuration of FIG. 4B is the elimination of channels 42,52 to provide a stronger hitch mount structure 10 from which less material has been removed.

As described, the illustrated and preferred embodiment of the modular hitch mount connection of the present invention utilizes only two bolts 20,22 cooperating with captive nuts 40,50, positioned on differing horizontal planes, preferably oriented at 90° to one another on the inside surface of the support tube 12. Application of sufficient turning force to the bolts 20,22 generates solid contact between two faces of each of the support tube 12 and the tubular seat 16. This contact, in contrast to prior art devices, applies across the full length of the inserted portion of the support tube 12 in the tubular seat 16 thereby providing an effective means of minimizing play and wobble in an interconnection, and especially in a connection assembly between a load carrier and hitch mount on a transporting vehicle. While they may be considered loose parts, the tensioning bolt 20 and connecting bolt 22 represent standard size bolts that, if lost are easy to replace by the owner.

FIG. 5A shows a cross-section of one embodiment of the modular hitch mount connection of the present invention that utilizes a tensioning bolt 20 and a connecting bolt 22 to secure the support tube 32 to the tubular seat 16 as previously described. In this case the tubular seat 16 has an open end 58 and the support tube 32 has equal cross section along its length, as in FIG. 3. This allows the support tube 32 to slide unimpeded through the tubular seat 16. While this facilitates alignment of holes and orifices (not shown), it also relies on the bodies of the tensioning bolt 20 and the connecting bolt 22 to bear the weight of the support tube 32 and any carrier frame that may be attached to it. FIG. 5B shows alternative positioning of a threaded nut 40 and a receiving nut 50 for placing these nuts 40,50 under compression, as previously described for FIG. 4B, when the hitch mount structure 10 is in an anti-wobble condition.

Figure 6:
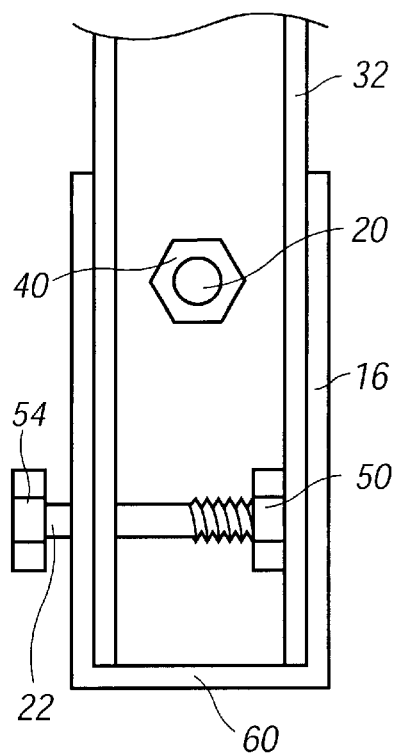
FIG. 6 is a cross sectional view similar to FIG. 5A with the mount, in this case, having a closed end.

FIG. 6 provides a cross sectional view of an alternative embodiment of the modular hitch connection of the invention which includes a tubular seat 16 with a closed end 60. The closed end position should provide abutment with the support tube 32 coincident with alignment of the holes and orifices (not shown). Alternatively, the orifices 26,46 (see FIGS. 4A and 4B) could be replaced by longitudinal slots to allow some flexibility in positioning the support tube 32, inside the tubular seat 16 with the closed end 60 bearing the load of the support tube 32. This allows the tensioning bolt 20 and the connecting bolt 22 to perform their connecting function free from the load bearing requirement addressed above.

Figure 7:
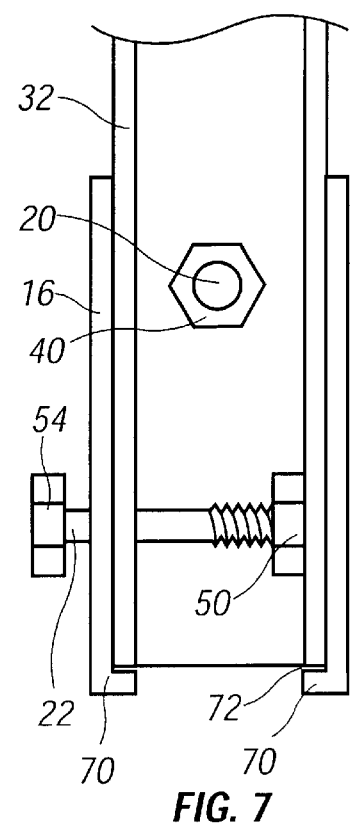
FIG. 7 is a cross sectional view with a pair of support ledges replacing the closed end of the mount shown in FIG. 6.

A third embodiment which is illustrated in FIG. 7 includes a lip 70 at the base of the tubular seat 16 that extends toward the central axis of the tubular seat 16. The lip 70 is sufficiently wide to prevent the support tube 32 from sliding all the way through the tubular seat 16. As previously discussed with respect to the closed end version of the modular hitch mount connection of the invention, the position of the lip 70 provides a load bearing ledge 72 for the support tube 32 so that the holes and orifices are in suitable alignment to allow a connection to be made by insertion of the tensioning and connecting bolts 20,22 thereacross. As before, accommodation of misalignment could involve replacement of the orifices 26,46 (see FIGS. 4A and 4B) with slots.

Although a durable modular hitch mount connection is possible using a support tube 32 of constant cross section, the stepped version shown in FIGS. 1 and FIG. 2 provides the required modular hitch load bearing rim 27 at the junction 30 between the tubular seat 12 and the support tube 16. The continuous lines of this embodiment also produce a modular hitch mount connection with a more attractive appearance.

A modular hitch mount connection and its components have been described herein. These and other variations which will be appreciated by those skilled in the art are within the intended scope of this invention as claimed below. As previously stated, detailed embodiments of the present invention are disclosed herein; however, it is to be understood that the disclosed embodiments are merely exemplary of the invention that may be embodied in various forms.

INDUSTRIAL APPLICABILITY

The present invention finds applicability in the load carrier industries, and especially in the sport rack industry.

What is claimed and desired to be secured by Letters Patent is as follows:

1. A modular hitch mount connection for attaching a tubular carrier structure to a load arm inserted in the receiving tube of a receiving type hitch, said modular hitch mount connection comprising:

a tubular seat having an open end and a first wall joined at an angle of 90° to a second wall, said first wall and said second wall each having at least one hole formed therein;

a support tube having a proximal end and a distal end, said proximal end sized to slidably engage said seat through said open end, said support tube further having an inner surface and first sidewall disposed at 90° to a second sidewall, said first sidewall and said second sidewall each having at least one orifice formed therein, said first wall of said tubular seat adjacent said first sidewall of said support tube with said at least one hole of said first wall in axial alignment with said at least one orifice of said first sidewall, said second wall of said tubular seat adjacent said second sidewall of said support tube with said at least one hole of said second wall in axial alignment with said at least one orifice of said second sidewall, said inner surface of said support tube, at said proximal end, having a threaded nut secured to said inner surface of said support tube, in axial alignment with said at least one orifice of said first sidewall and further having a receiving nut rigidly mounted on said inner surface of said support tube opposite and axially aligned with said at least one orifice formed in said second sidewall of said support tube;

a tensioning bolt inserted through said at least one hole of said first wall and said at least one orifice of said first sidewall to engage said threaded nut to secure said support tube to said tubular seat; and a connecting bolt inserted through said at least one hole of said second wall and said at least one orifice of said second sidewall to engage said receiving nut to secure said support tube to said tubular seat, said tensioning bolt and said connecting bolt restricting movement of said support tube by causing solid contact between said first wall and said first sidewall and said second wall and said second sidewall.

2. The modular hitch mount connection of claim 1 wherein said threaded nut is secured to the inner surface of said support tube closest to the orifice.

3. The modular hitch mount connection of claim 1 wherein said threaded nut is secured to the inner surface of said support tube opposite the orifice.

4. The modular hitch mount connection of claim 1 wherein said receiving nut is secured to the inner surface of said support tube closest to the orifice.

5. The modular hitch mount connection of claim 1 wherein said receiving nut is secured to the inner surface of said support tube opposite the orifice.

6. The modular hitch mount connection of claim 1 wherein said proximal end of support tube is smaller in cross-sectional dimension about the length of the support tube which slidably engages said tubular seat.

7. The modular hitch mount connection of claim 1 wherein the support tube is uniform in cross-sectional dimensions along the length of the support tube.

8. The modular hitch mount connection of claim 1 wherein the tubular seat further comprises a second open end opposite the open end.

9. The modular hitch mount connection of claim 1 wherein the tubular seat further comprises a closed end opposite the open end in which said distal end of said support tube abuts against said closed end of said tubular seat.

10. The modular hitch mount connection of claim 1 wherein the open end of said tubular seat further comprises a load bearing rim at the junction between the tubular seat and the support tube.

11. The modular hitch mount connection of claim 1 wherein the tubular seat further comprises a pair of opposing lips opposite the open end in which said lips are sized to prevent said distal end of said support tube from sliding through the tubular seat.

12. A modular hitch mount connection for attaching a tubular carrier structure to a load arm inserted in the receiving tube of a receiving type hitch said modular hitch mount connection comprising:

a tubular seat having an open end, said tubular seat comprising:

a first wall having at least one hole formed therein; and a second wall having at least one hole formed therein;

wherein said first wall and said second wall are joined at an angle of 90°;

a support tube having a proximal end and a distal end, said proximal end sized to slidably engage said tubular seat through said open end of said tubular seat, said support tube comprising:

a first sidewall having at least one slot formed therein;

a second sidewall having at least one slot formed therein;

an inner surface, a threaded nut secured to said inner surface;

a receiving nut rigidly mounted to said inner surface;

wherein said first wall of said tubular seat is adjacent to said first sidewall of said support tube with said at least one hole of said first wall in axial alignment with said at least one slot of said first sidewall, wherein said second wall of said tubular seat is adjacent to said second sidewall of said support tube with said at least one hole of said second wall in axial alignment with said at least one slot of said second sidewall, wherein said threaded nut is secure to said inner surface of said support tube at said proximal end and in axial alignment with said at least one slot of said first sidewall, wherein said receiving nut is rigidly mounted on said inner surface of said support tube opposite and axially aligned with said at least one slot formed in said second sidewall of said support tube;

a tensioning bolt inserted through said at least one hole of said first wall and said at least one slot of said first sidewall to engage said threaded nut to secure said support tube to said tubular seat; and a connecting bolt inserted through said at least one hole of said second wall and said at least one slot of said second sidewall to engage said receiving nut to secure said support tube to said tubular seat, said tensioning bolt and said connecting bolt restricting movement of said support tube by causing solid contact between said first wall and said first sidewall and said second wall and said second sidewall.

13. The modular hitch mount connection of claim 12 wherein said threaded nut is secured to the inner surface of said support tube closest to the orifice.

14. The modular hitch mount connection of claim 12 wherein said threaded nut is secured to the inner surface of said support tube opposite the orifice.

15. The modular hitch mount connection of claim 12 wherein said receiving nut is secured to the inner surface of said support tube closest to the orifice.

16. The modular hitch mount connection of claim 12 wherein said receiving nut is secured to the inner surface of said support tube opposite the orifice.

17. The modular hitch mount connection of claim 12 wherein said proximal end of support tube is smaller in cross-sectional dimension about the length of the support tube which slidably engages said tubular seat.

18. The modular hitch mount connection of claim 12 wherein the support tube is uniform in cross-sectional dimensions along the length of the support tube.

19. The modular hitch mount connection of claim 12 wherein the tubular seat further comprises a second open end opposite the open end.

20. The modular hitch mount connection of claim 12 wherein the tubular seat further comprises a closed end opposite the open end in which said distal end of said support tube abuts against said closed end of said tubular seat.

21. The modular hitch mount connection of claim 12 wherein the open end of said tubular seat further comprises a load bearing rim at the junction between the tubular seat and the support tube.

22. The modular hitch mount connection of claim 12 wherein the tubular seat further comprises a pair of opposing lips opposite the open end in which said lips are sized to prevent said distal end of said support tube from sliding through the tubular seat.

23. A modular hitch mount connection as recited in claim 12, wherein the support tube has a cross section at said distal end larger than the cross section at said proximal end.

24. A modular hitch mount connection as recited in claim 12, wherein said tubular seat includes a terminal end opposite said open end.

25. A modular hitch mount connection as recited in claim 24, wherein said terminal end is adapted to impede passage of said proximal end of said support tube through said tubular seat.

26. A modular hitch mount connection as recited in claim 25, wherein said terminal end is a closed end.

27. A modular hitch mount connection as recited in claim 25, wherein said terminal end includes a lip impeding passage of said proximal end of said support tube.

28. A modular hitch mount connection as recited in claim 12, wherein said support bar extends at an angle of 90° relative to a load arm.

29. A modular hitch mount connection for attaching a tubular carrier structure to a load arm inserted in the receiving tube of a receiving type hitch, said modular hitch mount connection comprising:

a tubular seat having an open end, and a wall having at least one hole formed therein;

a support tube having a proximate end and a distal end, said proximate end sized to slidably engage said seat through said open end, said support tube further having an inner surface and a sidewall having at least one orifice formed therein, said wall of said tubular seat adjacent said sidewall of said support tube with said at least one hole of said wall in axial alignment with said at least one orifice of said sidewall, said inner surface of said support tube, at said proximate end, having a threaded nut secured to said inner surface of said support tube, in axial alignment with said at least one orifice of said sidewall; and a tensioning bolt inserted through said at least one hole of said wall and said at least one orifice of said sidewall to engage said threaded nut to secure said support tube to said tubular seat, said tensioning bolt restricting movement of said support tube relative to said tubular seat by causing solid contact between said wall and said sidewall.

30. A modular hitch mount connection as recited in claim 29, wherein said wall of said tubular seat includes a first wall joined at an angle of 90° to a second wall, said first wall and said second wall each having at least one hole formed therein.

31. A modular hitch mount connection as recited in claim 30, said sidewall having a first sidewall disposed at 90° to a second sidewall, said first sidewall and said second sidewall each having at least one orifice formed therein, said first wall of said tubular seat adjacent said first sidewall of said support tube with said at least one hole of said first wall in axial alignment with said at least one orifice of said first sidewall, said second wall of said tubular seat adjacent said second sidewall of said support tube with said at least one hole of said second wall in axial alignment with said at least one orifice of said second sidewall, said inner surface of said support tube, at said proximate end, having a threaded nut secured to said inner surface of said support tube, in axial alignment with said at least one orifice of said first sidewall and further having a receiving nut rigidly mounted on said inner surface of said support tube opposite and axially aligned with said at least one orifice formed in said second sidewall of said support tube.

32. A modular hitch mount connection as recited in claim 31, wherein said tensioning bolt passes through said at least one hole of said first wall and said at least one orifice of said first sidewall to engage said threaded nut to secure said support tube to said tubular seat; said hitch mount connection further including a connecting bolt inserted through said at least one hole of said second wall and said at least one orifice of said second sidewall to engage said receiving nut to secure said support tube to said tubular seat, said tensioning bolt and said connecting bolt restricting movement of said support tube by causing solid contact between said first wall and said first sidewall and said second wall and said second sidewall.

33. A modular hitch mount connection as recited in claim 29, wherein the support tube has a cross section at said distal end larger than the cross section at said proximate end.

34. A modular hitch mount connection as recited in claim 29, wherein said tubular seat includes a terminal end opposite said open end.

35. A modular hitch mount connection as recited in claim 34, wherein said terminal end is adapted to impede passage of said proximate end of said support tube through said tubular seat.

36. A modular hitch mount connection as recited in claim 35, wherein said terminal end is a closed end.

37. A modular hitch mount connection as recited in claim 35, wherein said terminal end includes a lip impeding passage of said proximate end of said support tube.

38. A modular hitch mount connection as recited in claim 29, wherein said support bar extends at an angle of 90° relative to a load arm.

39. A method for forming a modular hitch mount connection for attaching a tabular carrier structure to a load arm inserted in the receiving tube of a receiving type hitch, said method comprising the steps of:

providing a load arm including a tabular seat having an open end, and a wall having at least one hole formed therein;

providing a support tube for a tubular carrier structure, said support tube having a proximate end and a distal end, an inner surface and a sidewall having at least one orifice formed therein, said inner surface of said support tube, at said proximate end, having a threaded nut secured thereto in axial alignment with said at least one orifice of said sidewall, said proximate end sized to slidably engage said seat through said open end;

inserting said proximate end of said support tube into said tubular seat such that said wall of said tubular seat lies adjacent said sidewall of said support tube with said at least one hole of said wall in axial alignment with said at least one orifice of said sidewall;

joining said support tube to said tubular seat using a tensioning bolt inserted through said at least one hole of said wall and said at least one orifice of said sidewall to engage said threaded nut to secure said support tube against said tubular seat; and applying sufficient turning force to said tensioning bolt to restrict movement of said support tube relative to said tubular seat by causing solid contact between said wall and said sidewall.

40. A method for forming a modular hitch mount connection for attaching a tubular carrier structure to a load arm inserted in the receiving tube of a receiving type hitch, said method comprising the steps of:

providing a load arm including a tubular seat having an open end, and a first wall joined at an angle of 90° to a second wall, said first wall and said second wall each having at least one hole formed therein;

providing a support tube for a tubular carrier structure, said support tube having a proximate end and a distal end, said proximate end sized to slidably engage said tubular seat through said open end, said support tube further having an inner surface and a first sidewall disposed at 90° to a second sidewall, said first sidewall and said second sidewall each having at least one orifice formed therein, said inner surface of said support tube, at said proximate end, having a threaded nut secured to said inner surface of said support tube, in axial alignment with said at least one orifice of said first sidewall and further having a receiving nut rigidly mounted on said inner surface of said support tube opposite and axially aligned with said at least one orifice formed in said second sidewall of said support tube;

inserting said proximate end of said support tube into said tubular seat such that said first wall of said tubular seat is adjacent said first sidewall of said support tube with said at least one hole of said first wall in axial alignment with said at least one orifice of said first sidewall, said second wall of said tubular seat adjacent said second sidewall of said support tube with said at least one hole of said second wall in axial alignment with said at least one orifice of said second sidewall;

joining said support tube to said tubular seat using a tensioning bolt inserted through said at least one hole of said first wall and said at least one orifice of said first sidewall to engage said threaded nut to secure said support tube to said tubular seat;

inserting a connecting bolt through said at least one hole of said second wall and said at least one orifice of said second sidewall to engage said receiving nut to further secure said support tube to said tubular seat; and applying sufficient turning force to said tensioning bolt and said connecting bolt to restrict movement of said support tube relative to said tubular seat by causing solid contact between said first wall and said first sidewall and said second wall and said second sidewall.

* * * * *